United States Patent [19]

Dean

[11] Patent Number: 5,465,422
[45] Date of Patent: Nov. 7, 1995

[54] SEAT APPARATUS FOR ACTUATING AN AUDIO SOURCE

[76] Inventor: Mark A. Dean, 7829 Normandy St., Miramar, Fla. 33023

[21] Appl. No.: 258,943

[22] Filed: Jun. 13, 1994

[51] Int. Cl.⁶ .............................. H04B 1/06; A47K 13/00
[52] U.S. Cl. .................. 455/344; 455/347; 455/352; 4/237; 4/661
[58] Field of Search ........................... 455/344, 345, 455/347, 349, 350, 352, 355, 99, 151.2; 4/300, 483, 661, 406, 408, 213, 237, 234, 242.1, 254

[56] References Cited

U.S. PATENT DOCUMENTS

| | | | |
|---|---|---|---|
| 4,451,940 | 6/1984 | Grunz | 4/234 |
| 4,521,919 | 6/1985 | Molloy | 455/347 |
| 4,702,342 | 10/1987 | Hale | 455/345 |
| 4,868,888 | 9/1989 | Dayton | 455/344 |
| 4,920,583 | 5/1990 | Hough et al. | 4/237 |
| 5,008,964 | 4/1991 | Dean et al. | 4/661 |
| 5,212,816 | 5/1993 | Gimenez et al. | 455/345 |
| 5,253,375 | 10/1993 | Prosper | 4/661 |

*Primary Examiner*—Edward F. Urban
*Assistant Examiner*—Nguyen Vo

[57] ABSTRACT

An audio apparatus including a seat supportable on a support surface and having a concealed switch mounted therein which activates an audio source when a person sits on the seat. The apparatus provides the capability to be powered by battery or standard house current. The audio source is mounted within the seat or a lid movably attached to the seat. Alternatively, the audio source may be located externally of the seat or lid, being controlled by a remote control within the seat and interconnected to the switch.

3 Claims, 1 Drawing Sheet

U.S. Patent  Nov. 7, 1995  5,465,422
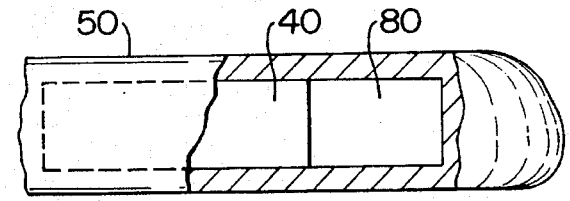
FIG. 4
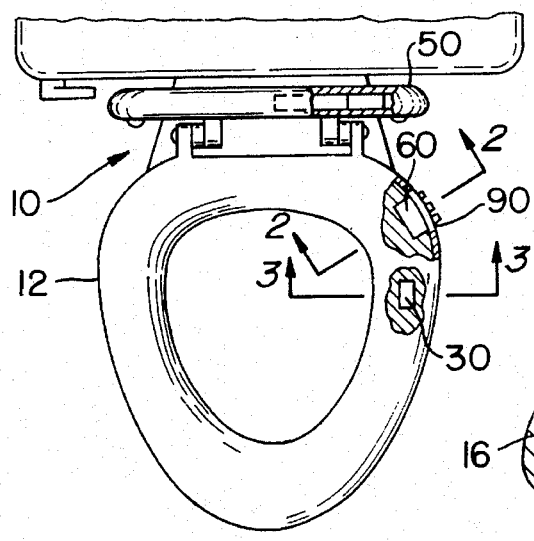
FIG. 1  FIG. 2
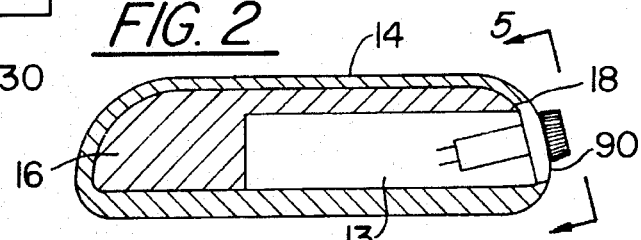
FIG. 3
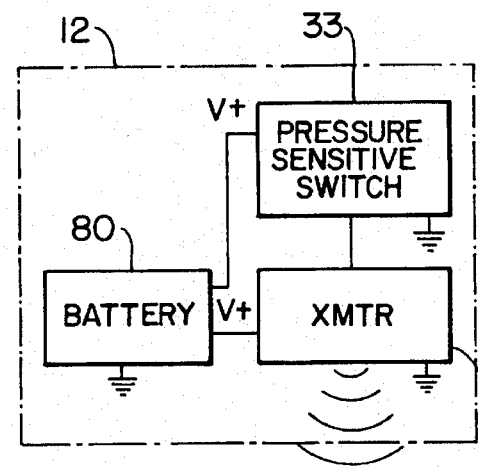
FIG. 5
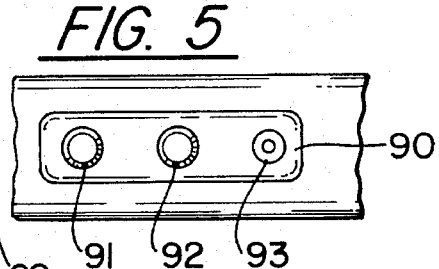
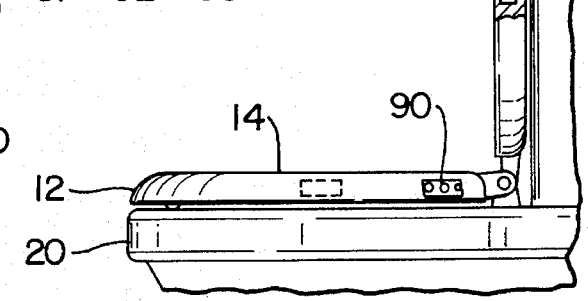
FIG. 8
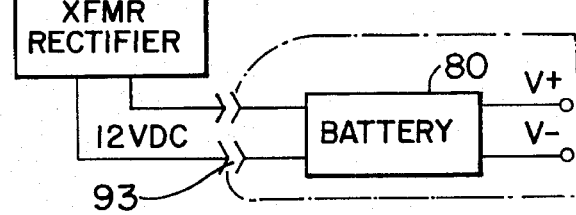
FIG. 7
FIG. 6

5,465,422

SEAT APPARATUS FOR ACTUATING AN AUDIO SOURCE

BACKGROUND OF THE INVENTION

1. Field of the Invention

The present invention relates to a seat, and more particularly, to a seat assembly having an audio device which is activated when a person sits on the seat.

2. Description of the Related Art

In recent years, seats have been adopted to provide various functions in addition to their basic seating function. Toilet seats, for example, have been designed to provide features which increase the comfort of the user. One particular type of toilet seat commonly referred to as a cushioned toilet seat, is shown in U.S. Pat. No. 4,451,940. But this reference does not provide any audio capability.

Another type of toilet seat, shown in U.S. Pat. No. 4,920,583, is a vibrating toilet seat wherein a vibrating motor is placed within a cushioned toilet seat and which is designed to vibrate when the user sits on the seat. This device is limited to a vibrating seat and does not provide any audio capability.

Another type of toilet seat, shown in U.S. Pat. No. 5,008,964, is the child's toilet which is a small toilet trainer or potty chair as they are more commonly known, designed to play a tune when a child sits on the seat. The child's toilet provides a small seat to suit the small physical size of children, but does not provide the capability to be used on a standard toilet by an adult.

A type of audio device designed to be used with a standard toilet is shown in U.S. Pat. No 4,521,919. However, this reference provides a device in the shape of an animal which is located externally of the toilet and which is actuated when the toilet seat is raised.

Applicant's invention is designed to add a dimension of comfort and relaxation to seats in a manner not previously known by providing for a seat which includes an audio device which is actuated when a person sits on the seat. The audio device may either be concealed within the seat assembly or located externally.

SUMMARY OF THE INVENTION

The present invention relates to an audio apparatus, which includes a seat, specifically adapted to provide audio when a person sits on the seat. The audio apparatus includes primarily a base having actuation means therein for controlling the operation of an audio source. The base includes a top surface defining a seat and is adapted to be supported on a support surface and structured to support a person in a seated position thereon. At least a portion of the base is hollow. The actuation means includes a normally open switch, mounted and concealed within the hollow portion of the base, structured and disposed to close in response to a person sitting on the top surface of the base and to open when the person is removed from the top surface. The audio source is activated when the switch is closed and is turned off when the switch is opened. The audio source may either be concealed within the seat assembly or located externally.

With the foregoing in mind, it is an object of the present invention to provide an audio apparatus, including a seat, which provides audio when a person sits on the seat.

It is another object of the present invention to provide an audio apparatus, including a seat, which is adapted to be supported on a support surface and structured to support a person in a seated position thereon.

It is a further object of the present invention to provide an audio apparatus with means for concealing the audio source either within the seat assembly or externally of the seat assembly.

It is yet a further object of the present invention to provide an audio apparatus with means for manually controlling the audio source located within the seat assembly.

It is still another object of the present invention to provide an audio apparatus which may be powered by either a DC power source or standard house current.

These and other objects and advantages of the present invention will become more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 1 is a top plan view of the base and attached lid of the present invention.

FIG. 2 is a cross-sectional view, taken along the line 2—2 of FIG. 1 showing the audio controls.

FIG. 3 is a cross-sectional view, taken along the line 3—3 of FIG. 1 showing the switch mechanism.

FIG. 4 is an isolated view of the lid shown in FIG. 1 taken in partial section.

FIG. 5 is a right side elevation of the base shown in FIG. 1 showing the audio controls.

FIG. 6 is a circuit block diagram showing the remote control configuration.

FIG. 7 is a circuit block diagram showing the AC power input configuration.

FIG. 8 is a right side elevation of the base and lid shown in FIG. 1.

Like reference numerals refer to like parts throughout the several views of the drawings.

DETAILED DESCRIPTION OF THE PREFERRED EMBODIMENT

With reference to FIGS. 1–8, the present invention is directed to an audio apparatus, generally indicated as 10, including a base 12, a portion of which is hollow 13, having a top surface 14 defining a seat, adapted to be supported on a support surface 20 and structured to support a person in a seated position thereon. The seat is of the cushioned type and is provided with conventional padding material 16, which could be foam, or another cushioning material.

A switch mechanism 30 is mounted within the hollow portion of the base and includes a post 31, a normally open pushbutton switch 33 mounted vertically within the mechanism and adjacent to the port 31 and comprising a base 34 shorter than the post, and a button 35 above the base and extending above the top distal end 32 of the post when not depressed, a lever 36 positioned above the switch button 35 and parallel to the top surface of the base 14, and a biasing element 37 structured and disposed to hold the lever 36 above the switch button 35 when no pressure is exerted on the top surface of the base 14 thereby allowing the switch button 35 to remain in the raised or undepressed position and the switch 33 to remain open. The switch 33 is electrically interconnected between the power source 80 and audio source 40 or transmitter 60. When pressure is exerted on the top surface of the base 14, the lever 36 is forced downward thereby depressing the button 35 and closing the switch 33, completing the circuit from the power source 80 to the audio source 40 or transmitter 60. The biasing element 37 forces the lever 36 to return to a raised position above the button 35 when the pressure is removed from the top surface of the seat 14 thereby allowing the button 35 to return to a raised or undepressed position and the switch 33 to open breaking the circuit from the power source 80 to the audio source 40 or transmitter 60.

An audio source 40 is structured and disposed to transmit audible sounds upon operation thereof. The audio source 40 is located externally of the base 12 and is activated when the switch 33 is closed and deactivated when the switch 33 is open.

The audio apparatus is designed to either provide a totally self-contained seating assembly including the audio source 40 or to provide remote control means within the base 12 to control an external audio source 40. If the self-contained assembly is desired, the audio source 40 is mounted within a lid 50, as shown in FIG. 4, and interconnected to the switch 33. The lid 50 is movably mounted to the support surface 20 and independently movable relative to the support surface 20 and the base 12 between a raised position and a lowered position in covering relation to the top surface of the base 14.

With reference to FIG. 6, if it is desired to have the audio source 40 located externally of the seating assembly, a transmitter 60 is mounted and concealed within the base 12 and interconnected to switch 33. Upon closing the switch 33, the circuit between the power source 80 and the transmitter 60 is completed and the transmitter 60 transmits a signal to a receiver 70, located externally of the seating assembly and interconnected to the audio source 40 via a relay 72, thereby activating the audio source 40. A battery or standard house current 74 provides power to the receiver 70 and audio source 40 (via a relay 72).

With reference to FIG. 2 and 5, a control panel 90 may be provided on the side outer surface 18 of the base 12 and include an on/off/volume switch 91, tuning control 92, and an external power jack 93. The on/off/volume switch 91 provides the user with the capability to override the audio function of the audio apparatus and utilize the apparatus solely as a seat as well as vary the audio volume. In the "on" position, the audio apparatus is automatically activated when the user sits on the seat. In the "off" position, the audio source cannot be activated and the apparatus functions solely as a seat. The tuning control 92 provides the user with the capability to select the station of their choice while seated on the audio apparatus.

The audio apparatus is designed to be powered by either a DC power source 80 mounted and concealed within the lid 50 and interconnected to the audio source 40 or transmitter 60 for supplying power thereto or by AC from a standard wall outlet via the external power jack 93 on the control panel 90, also interconnected to the audio source 40 or transmitter 60 for supplying power thereto. Referring to FIG. 7, a transformer/rectifier 82 converts the AC voltage from a standard wall outlet to DC voltage capable of powering the audio apparatus.

The present invention can be incorporated into a wide variety of seats including toilet seats, an automobile seat or an auxiliary cushion for use in an automobile, or an auxiliary or principal seat for use in a meeting room or office waiting room. As long as the seat is constructed to include a hollow portion for the switch and audio source (or remote control transmitter), and is sufficiently flexible to allow activation of the switch, virtually any cushioned seat used in almost any context can be used to practice the present invention.

The present invention, when incorporated into a conventional cushioned toilet seat, can be easily installed on virtually any toilet bowl. The addition of the audio source (or remote control transmitter), switch, power source and controls will not effect the means of affixation to the toilet bowl. Indeed, the outward appearance of the invention is identical to that of a conventional cushioned toilet seat. All of the devices of the invention, with the exception of the controls, are concealed within the seat.

The present invention is very safe, especially when used with the low voltage DC power source. Further, the invention is easy to use; audio is normally controlled merely by sitting on the seat, and by rising from the seat.

Use of the invention induces relaxation, comfort, entertainment, and general pleasure. The invention can also be used as a means of advertising goods and services. The invention has the same size and appearance as conventional cushioned seats and can be used in the conventional way if the on/off switch is simply turned off.

Various changes may be made within the spirit and scope of the invention as described above and set forth in the accompanying claims. The exact locations and structure of the audio source (or remote control transmitter), switch, DC power source and controls may be modified. Further, the type of padding material in the seat, as well as the type of audio source (radio, cassette, CD), may vary.

What is claimed:

1. A seat apparatus comprising:

a base including a top surface defining a seat, said base structured to be supported on a support surface and structured to support a person in a seat position thereon, at least a portion of said base being hollow, a lid movably mounted to said support surface and independent movable relative to said support surface and said base between a raised position and a lowered position in covering relation to said top surface of said base, audio means located externally of said base and structured and disposed for transmitting audible sounds upon operation thereof, control means for controlling operation of said audio means, said control means including means for controlling power and volume of said audio means, actuation means for operating said audio means between an on and off condition, said actuation means being mounted and concealed within the hollow portion of said base, said actuation means including a normally open switch structured and disposed to close in response to the person sitting on said top surface of said base, said switch being further structured to open when the person is removed from said top surface, wherein closing of said switch operates said audio means to said on condition, and opening of said switch operates said audio means to said off condition, transmitter means mounted and concealed within said base, said transmitter means connected to said switch for transmitting an activation signal into the air upon closing of said switch, and receiver means remotely located from said transmitter means and connected to said audio means, wherein said receiver means operates said audio means to said on condition upon a receipt of said activation signal transmitted from said transmitter means.

2. An apparatus as recited in claim 1 wherein said normally open switch is a pressure sensitive switch, wherein said switch is closed in response to pressure exerted on said top surface of said base.

3. An apparatus as recited in claim 1 further comprising power supply means connected to said audio means, said power supply means including means for converting AC voltage to DC voltage for powering said audio means.

* * * * *